(12) United States Patent
Gieras et al.

(10) Patent No.: US 7,124,495 B2
(45) Date of Patent: Oct. 24, 2006

(54) METHOD FOR MAKING AN ELECTRIC MOTOR

(75) Inventors: Jacek F. Gieras, Glastonbury, CT (US); Zbigniew Piech, Cheshire, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 11/141,627

(22) Filed: May 31, 2005

(65) Prior Publication Data

US 2005/0204545 A1 Sep. 22, 2005

Related U.S. Application Data

(62) Division of application No. 09/740,231, filed on Dec. 18, 2000, now Pat. No. 6,952,068.

(51) Int. Cl.
*H02K 21/12* (2006.01)
*H02K 16/02* (2006.01)

(52) U.S. Cl. .............................. 29/596; 29/597; 29/598; 310/254

(58) Field of Classification Search .......... 29/596–598, 29/729, 739; 310/254, 216, 49 R, 112, 114
See application file for complete search history.

(56) References Cited

U.S. PATENT DOCUMENTS

| | | | |
|---|---|---|---|
| 1,245,762 A | 11/1917 | Neuland | |
| 2,382,333 A | 8/1945 | Poole | |
| 2,541,830 A | 2/1951 | Phaneuf | |
| 2,908,965 A | 10/1959 | Platt | |
| 3,330,975 A | * 7/1967 | Osterwalder | ................ 310/164 |
| 3,411,059 A | 11/1968 | Kaiwa | |
| 3,571,640 A | 3/1971 | Watt | |
| 3,602,749 A | 8/1971 | Esters | |
| 3,700,942 A | 10/1972 | Alth | |
| 3,705,971 A | 12/1972 | Jacovides | |
| 3,755,701 A | 8/1973 | Culver | |
| 3,786,336 A | 1/1974 | Lohr | |
| 3,803,433 A | 4/1974 | Ingenito | |
| 4,127,802 A | 11/1978 | Johnson | |

(Continued)

FOREIGN PATENT DOCUMENTS

GB 2176944 1/1987

(Continued)

OTHER PUBLICATIONS

Blissenbach, R., Henneberger, G., Schafer, U. and Hackmann, W.: Development of a Traverse Flux Traction Motor in a Direct Drive System, Int. Conf. on Electr. Machines ICEM'2000, Espoo, Helsinki, 2000, vol. 3, pp. 1457-1460.

(Continued)

*Primary Examiner*—Minh Trinh
(74) *Attorney, Agent, or Firm*—Carlson, Gaskey & Olds

(57) ABSTRACT

Transverse flux electric motors are made using a unique process where individual components are premade and then assembled together. A stator portion is made by nesting a coil between two stator core portions. In a disclosed example, distinct first and second stator core portions are formed. The stator core portions in disclosed examples are made from laminations or sintered powder materials. In a disclosed arrangement, a coil is supported between the core portions of the stator such that the core portions enclose at least part of axial surfaces on the coil. A rotor that has a core and a plurality of magnets is supported relative to the stator for relative rotary motion such that the plurality of magnets of the rotor interact with the stator core portions during the relative rotary motion.

11 Claims, 4 Drawing Sheets

U.S. PATENT DOCUMENTS

| | | | |
|---|---|---|---|
| 4,206,374 | A | 6/1980 | Goddjin |
| 4,316,109 | A | 2/1982 | Mason |
| 4,329,601 | A | 5/1982 | Mai |
| 4,488,075 | A | 12/1984 | DeCesare |
| 4,691,133 | A | 9/1987 | Mongeau |
| 4,720,650 | A | 1/1988 | Hanamori et al. |
| 4,745,318 | A | 5/1988 | Ivanics |
| 4,764,697 | A | 8/1988 | Christiaens |
| 4,982,128 | A | 1/1991 | McDonald |
| 5,051,641 | A | 9/1991 | Weh |
| 5,111,098 | A | 5/1992 | Peck et al. |
| 5,117,142 | A | 5/1992 | von Zweygbergk |
| 5,216,339 | A | 6/1993 | Skybyk |
| 5,223,760 | A | 6/1993 | Peck et al. |
| 5,245,258 | A | 9/1993 | Becker et al. |
| 5,289,072 | A | 2/1994 | Lange |
| 5,382,857 | A | 1/1995 | Schellhorn et al. |
| 5,485,046 | A | 1/1996 | Kaplan et al. |
| 5,528,093 | A | 6/1996 | Adam et al. |
| 5,777,418 | A | 7/1998 | Lange et al. |
| 5,907,885 | A | 6/1999 | Tilli et al. |
| 5,942,829 | A | 8/1999 | Huynh |
| 6,005,317 | A | 12/1999 | Lamb |
| 6,011,337 | A | 1/2000 | Lin et al. |
| 6,087,755 | A | 7/2000 | Suzuki et al. |
| 6,114,785 | A | 9/2000 | Horng |
| 6,153,959 | A | 11/2000 | Lorenzo |
| 6,201,326 | B1 | 3/2001 | Klappenbach et al. |
| 6,229,238 | B1 | 5/2001 | Graef |
| 6,389,678 | B1 * | 5/2002 | Ackermann et al. .......... 29/596 |
| 6,492,758 | B1 | 12/2002 | Gianni et al. |
| 2001/0002095 | A1 | 5/2001 | Sakamoto |
| 2002/0070627 | A1 | 6/2002 | Ward et al. |
| 2002/0171315 | A1 | 11/2002 | Kastinger |

FOREIGN PATENT DOCUMENTS

| | | |
|---|---|---|
| WO | WO 99/41824 | 8/1999 |

OTHER PUBLICATIONS

Harris, M.R., Pajooman, G.H., Abu Sharkh, S.M. and Mecrow, B.C.; Comparison of Flux-Concentrated and Surface-Magnet Configurations of the VPRM (Traverse-Flux) Machine, ICEM'98, Istanbul, Turkey, 1998, pp. 1119-1122.

Kruse, R. Pfaff, G. and Pfeiffer, C.: Traverse Flux Reluctance Motor for Direct Sevodrive Applications, IEEE IAS Conf., St. Louis, MI, 1998, pp. 655-662.

Lange, A., Canders, W.R. Laube, F. and Mosebach, H.: Compromise of Different Drive Systems for a 75 kW Electrical Vehicle Drive, Int. Conf. on Electr. Machines ICEM'2000, Espoo, Helsinki, 2000, vol. 3, pp. 1308-1312.

Masmoudi, A. and Elantably, A.: TFPM Concept based Hybrid Bus Electric Propulsion Machinery: Pre-Prototyping Design Assessment of Two Major Topologies, Int. Conf. on Electr. Machines ICEM'98, Istanbul, Turkey, 1998, vol. 2, pp. 1150-1155.

Mecrow, B.C., Jack, A.G. and Maddison, C.P.: Permanent Magnet Machines for High Torque, Low Speed Applications, ICEM'98 Proceedings, vol. 1, International Conference on Electrical Machines, Sep. 2-4, 1998, Istanbul, Turkey, 1998.

Maddison, C.P., Mecrow, B.C. and Jack, A.G.: Claw Pole Geometries for High Performance Traverse Flux machines, Int. Conf. on Electr. Machines ICEM'98, Istanbul, Turkey, 1998, vol. 1, pp. 340-345.

* cited by examiner

US 7,124,495 B2

METHOD FOR MAKING AN ELECTRIC MOTOR

CROSS-REFERENCE TO RELATED APPLICATIONS

This application is a divisional of U.S. patent application Ser. No. 09/740,231 filed Dec. 18, 2000, now U.S. Pat. No. 6,552,068, issued Oct. 4, 2005.

BACKGROUND OF THE INVENTION

This invention generally relates to transverse flux electric motors. More particularly, this invention relates to a strategy for fabricating the components of a transverse flux motor in a practical and cost-effective manner.

It has recently become apparent that there are significant advantages to utilizing gearless propulsion systems in elevator and escalator systems, for example. With a gearless propulsion arrangement, there are no gear trains between the propulsion machine or mechanism and the driven components (such as the sheaves in an elevator system). Gearless propulsion systems typically have fewer components and are more compact than traditional geared arrangements. An additional advantage is that gearless propulsion systems reduce acoustic noise and simplify maintenance procedures.

One challenge presented in attempting to use gearless propulsion systems is that they typically require electric motors, which often prove difficult to make with the desired performance characteristics. Permanent magnet motors are advantageous because they are capable of developing higher torque densities with higher efficiency compared to induction or switched reluctance arrangements. Permanent magnet transverse flux motors are capable of producing even higher torque densities than permanent magnet brushless motors.

A significant challenge is presented when attempting to build such a system because transverse flux machines are typically relatively expensive. The armature of a transverse flux motor has a complicated structure. Typical attempts include laminating arc-shaped sheets and embedding conductive coils in the laminated stack by arranging the coils within concentric slots. Although the process would be improved by utilizing wedge-shaped lamination sheets formed by a hot rolling process, that approach is undesirably expensive.

There is a need for an improved method of making the components of transverse flux electric motors that avoids the complications and expenses associated with current approaches. This invention addresses those needs while avoiding the shortcomings and drawbacks of the prior art.

SUMMARY OF THE INVENTION

In general terms, this invention is a method for making transverse flux motor components. The method of this invention includes several basic steps. A stator portion is made by forming first and second stator core portions. A coil is supported between the core portions to complete the stator. A rotor is formed having a core and a plurality of magnets. The rotor and stator are then supported for relative rotary motion between them such that the plurality of magnets of the rotor interact with the stator core portions during the relative rotary motion.

In a preferred embodiment, the stator includes support members on axial outside surfaces of the core portions. The support members also may support a plurality of magnetic core members, which provide for enhanced flux transfer and motor performance.

An electric motor designed according to this invention includes a stator having first and second stator core portions and a coil supported between the core portions. A rotor has a core and a plurality of magnets supported on the core. The magnets preferably are permanent magnets. The stator and rotor are supported for relative rotary motion between them such that the plurality of magnets of the rotor interact with the stator core portions during relative rotary motion between them.

The various features and advantages of this invention will become apparent to those skilled in the art from the following description of the currently preferred embodiments. The drawings that accompany the detailed description can be briefly described as follows.

DETAILED DESCRIPTION OF THE PREFERRED EMBODIMENTS

FIGS. 1–7 show a first example implementation of this invention. An electric motor assembly 20 includes a stator 22 and a rotor 24. The stator 22 and rotor 24 are supported for relative rotary motion to generate electrical power in a manner that is understood by those skilled in the art.

Figure 1:
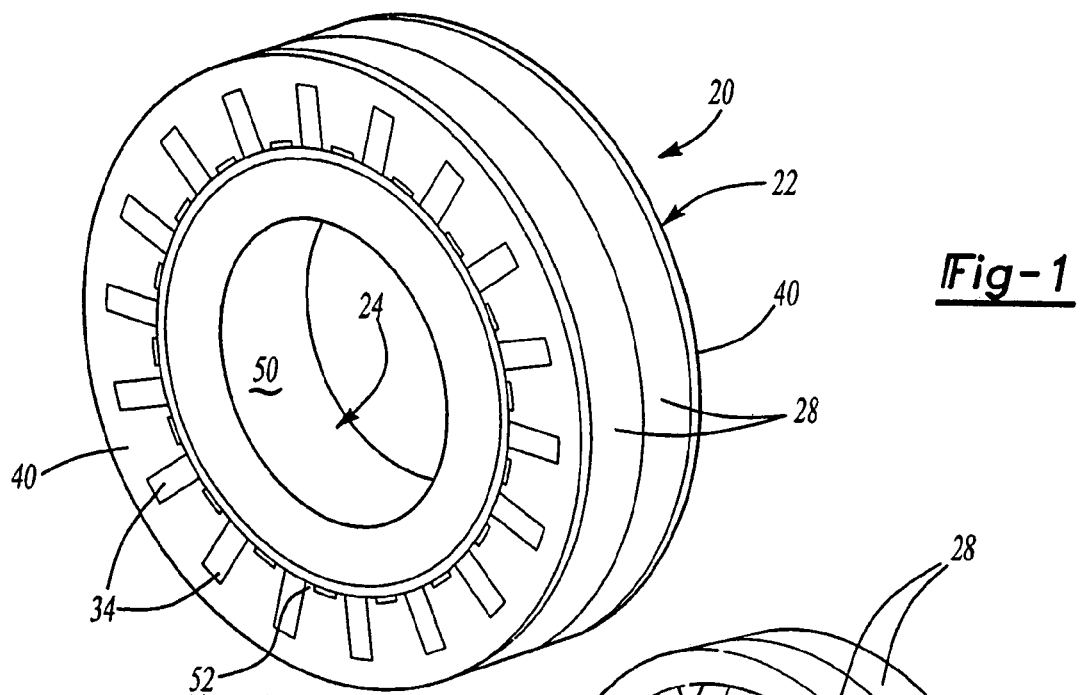
FIG. 1 is a diagrammatic, perspective illustration of an electric motor assembly designed according to this invention.
Figure 3:
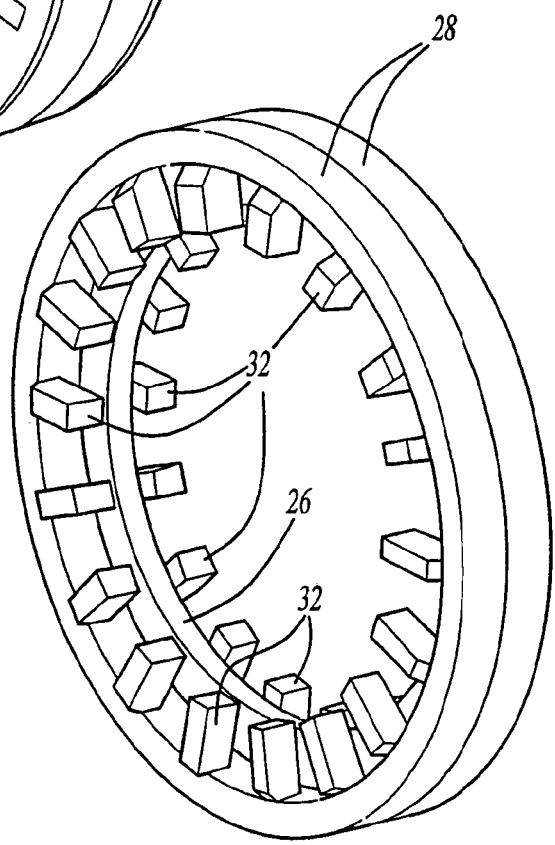
FIG. 3 illustrates the components of FIG. 2 in an assembled condition.
Figure 2:
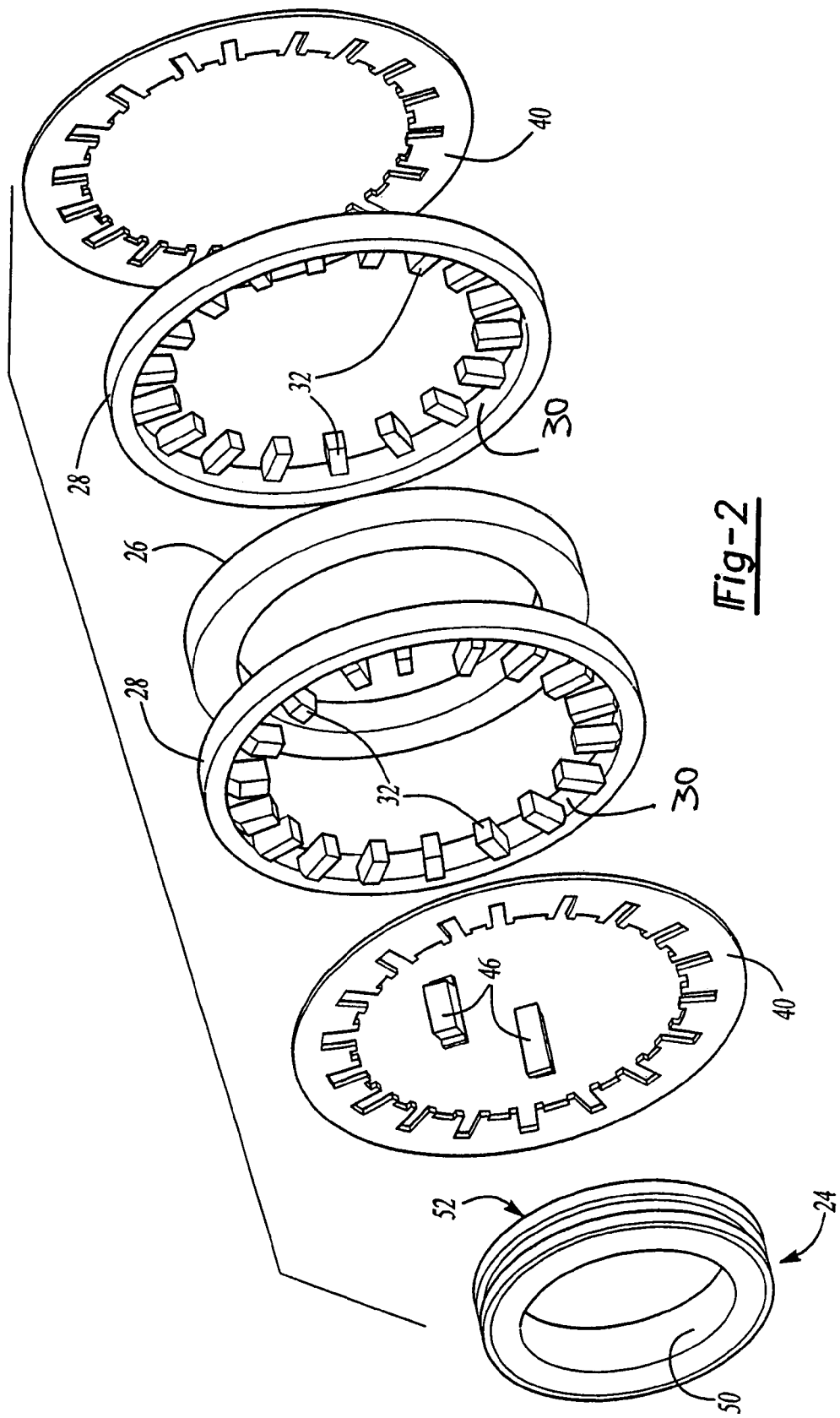
FIG. 2 is an exploded view of a stator designed according to this invention.

As best seen in FIGS. 2 and 3, the stator 22 preferably includes a coil 26 supported between a pair of stator core portions 28. Each core portion 28 preferably includes an inner coil supporting surface 30 and a plurality of radially extending projections 32. The stator poles are provided by the projections 32, which preferably are equally, circumferentially spaced about the stator core portions 28 facing inward toward a central axis of the stator. The coil 26 preferably is placed between two opposing stator core portions 28 in a nesting relationship as illustrated in FIG. 3.

Figure 4:
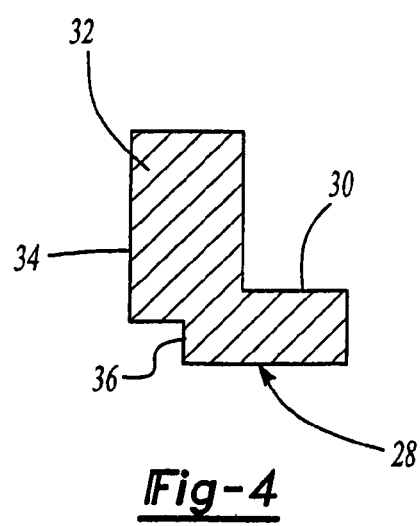
FIG. 4 is a partial cross-sectional view taken along the lines 4—4 in FIG. 2.

In the illustrated example, although it is not required to achieve the results provided by this invention, the projections 32 on the core portions 28 preferably includes an axial outward surface 34 that extends beyond an axial outward surface 36 on the ring portion of each core 28. This is best seen in the illustration of FIG. 4. When the axially outward surfaces 34 extend as illustrated, this provides a convenient means for placing outer support members 40 on each side of the stator 22.

Figure 5:
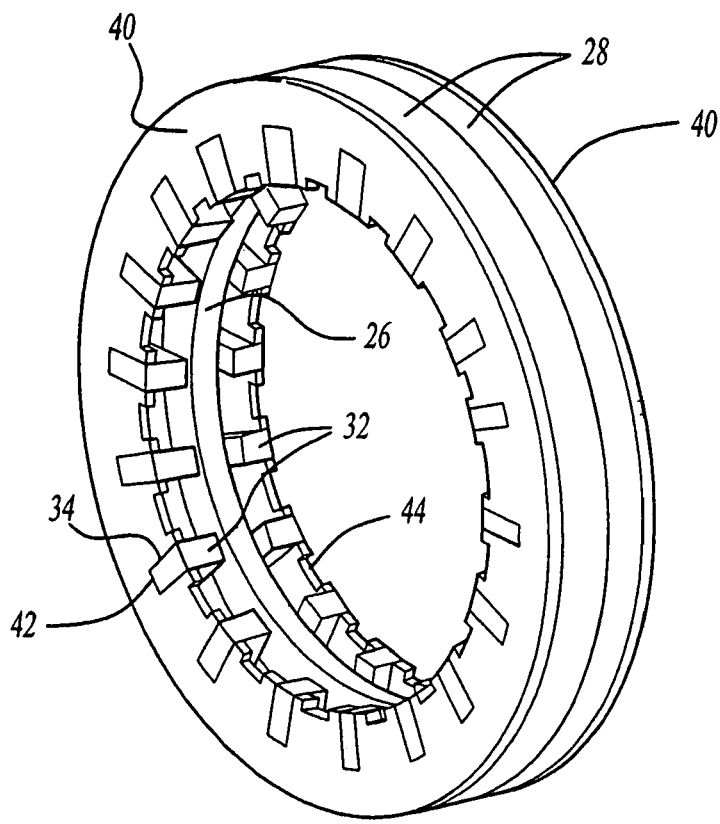
FIG. 5 is a perspective illustration of the stator during a later portion of a preferred assembly process.

As best seen in FIG. 5, two outer support members 40 preferably are received about the outer axial surfaces of the core portions 28. The outer support members 40 preferably include a plurality of slots 42 that corresponds to the number of projections 32 on the core portions 28. The outer surfaces 34 on the projections 32 preferably are aligned with the outermost surface of the support members 40 to provide a smooth outer surface.

Figure 6:
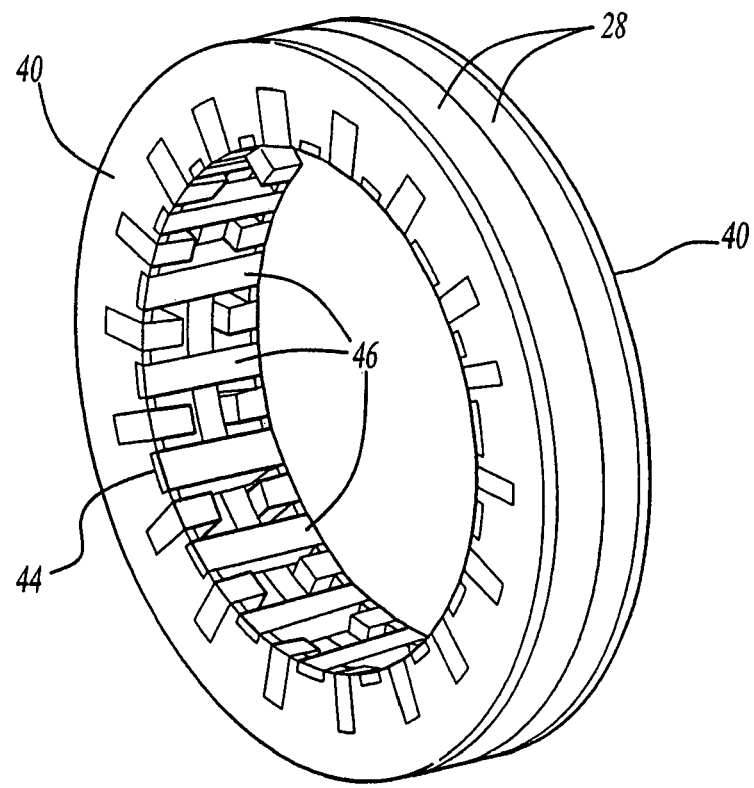
FIG. 6 illustrates another feature of a stator designed according to this invention.

In the preferred embodiment, the outer support members 40 include a plurality of receiver portions 44 that receive magnetic core members 46 (shown in FIG. 6). The magnetic core portions 46 are provided in some examples to increase the magnetic flux density across the air gap between the stator and rotor to achieve different flux densities for different power levels, for example. The magnetic core members 46 preferably have a [generally I-shaped] selected configuration so that they are snugly received between the two support members 40 and held in place adjacent the coil 26. In one example, the core members 46 are generally I-shaped. In the illustrated example, the core members 46 have a generally T-shaped configuration. As illustrated, when magnetic core members 46 are utilized, they preferably are interspersed between the sets of projections 32 on the stator core portions 28.

It should be noted that the magnetic core portions 46 and the support members 40 are not required in all embodiments of this invention. The currently preferred embodiment of FIGS. 1–7 includes the support members 40 and the core portions 46.

The various portions of the stator 22 preferably are individually made and then assembled together in the general order shown as the figures progress in number. In other words, it is preferred to premake the coil 26 and insert it between two premade stator core portions 28. Then the outer support members 40 can be assembled onto the outsides of the core portions 28 and, if desired, the magnetic core portions 46 are then inserted in their positions.

The entire stator assembly preferably is coated using an epoxy resin, which ensures that the various components are held together. Other bonding methods may be used to secure, for example, the two stator core portions 28 together, which will maintain the coil 26 in a nested position between the core portions 28. The core portions 28 preferably are made from sintered powder materials. Similarly, the core portions 46 preferably are made from sintered powder materials. The outer support portions 40 preferably are made from a non-ferromagnetic material. The outer support portions 40 provide the ability to include magnetic core portions 46, which magnify the magnetic flux density in the air gap between the stator 22 and the rotor 24.

Figure 7:
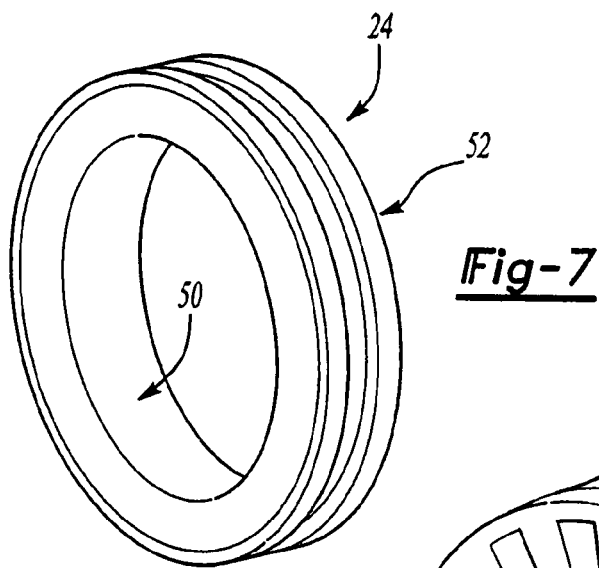
FIG. 7 is a diagrammatic, perspective illustration of a rotor designed according to this invention.

As illustrated in FIG. 7, the rotor 24 preferably includes a rotor core 50 and a plurality of permanent magnets 52. As is understood in the art, the permanent magnets 52, which are ring-shaped in the illustrated example, include a plurality of north and south poles. The permanent magnets 52 preferably are aligned on the core 50 such that when the rotor 24 and stator 22 are in an assembled condition, the permanent magnets 52 are positioned to interact with the projections 32 on the stator core portions 28 to generate electrical power as is known in the electrical motor art.

Assembling individual components in the manner illustrated and discussed above provides significant cost savings in manufacturing permanent magnet transverse flux motors. When it is desired to have a multi-phase motor, a plurality of stators 22 and rotors 24 can be stacked or aligned together and then supported in an appropriate housing (not illustrated). Given this description, those skilled in the art will understand how to support a plurality of such assemblies when desired.

Figure 8:
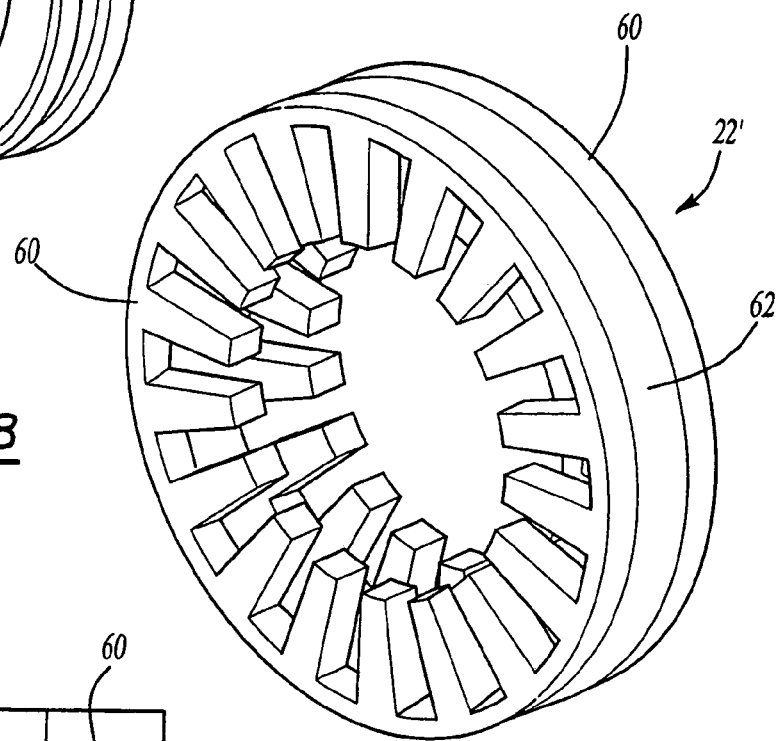
FIG. 8 is a perspective, diagrammatic illustration of another embodiment of a stator designed according to this invention.
Figure 9:
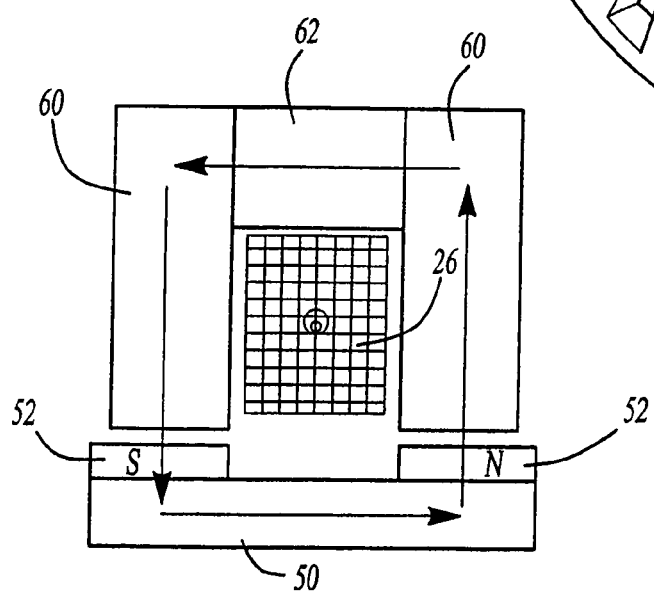
FIG. 9 is a cross-sectional view of another embodiment of this invention.

In another example of this invention, sintered powder materials are not used for making the various components of the stator and rotor. Instead, laminations are preferred in some example implementations of this invention. One such example is illustrated in FIGS. 8 and 9 where a pair of radially laminated stacks 60 takes the place of the stator core portions 28 of the previous example. In this example, the stator core portions 60 are made from laminations instead of sintered powder materials. Because laminations are used, a separate yoke portion 62 preferably is placed between the stator core portions 60 so that the coil 26 may be supported between them in a nested fashion as illustrated. Forming laminations of the type illustrated including a ring-shaped yoke 62 and the core portions 60 is possible and avoids the difficulties of attempting to form laminations as required in previous designs. A variety of rotor core materials 50 may be used, including sintered powders or laminations to support the permanent magnets 52. The example of FIGS. 8 and 9 operates the same as that in the previous figures, it is just that different manufacturing processes and materials are utilized.

This invention provides permanent magnet transverse flux motors that are made using a unique process that is cost effective and more practical than previous attempts. The description provided gives example implementations of this invention. The description is not to be interpreted in a limiting sense. Variations and modifications may become apparent to those skilled in the art that do not necessarily depart from the purview and spirit of this invention. The scope of legal protection given to this invention can only be determined by studying the following claims.

We claim:

1. A method of making an electric motor, comprising the steps of:
   (A) forming a stator by
      (1) forming distinct first and second stator core portions;
      (2) supporting a coil between the core portions such that the core portions enclose at least part of axial surfaces on the coil;
   (B) forming a rotor having a core and a plurality of magnets;
   (C) supporting the rotor relative to the stator for relative rotary motion between the rotor and the stator such that the plurality of magnets of the rotor interact with the stator core portions during relative rotary motion between the stator and the rotor.

2. The method of claim 1, wherein step (A) includes supporting the core portions and the coil between two support members that enclose at least part of outward axial surfaces of the core portions.

3. The method of claim 2, including supporting a plurality of magnetic core members by the support members.

4. The method of claim 3, including providing a plurality of slots on the support members and inserting the magnetic core members in corresponding ones of the slots.

5. The method of claim 1, wherein step (A) includes forming each core portion such that each includes a generally annular ring and a plurality of circumferentially spaced projections that project radially inward from the ring.

6. The method of claim 5, including providing two support members with a plurality of radially inwardly projecting spacer portions and interspersing the core portion projections and the spacer portions such that outward axial surfaces on the core projections are not covered by the support members.

7. The method of claim 6, including forming a plurality of slots in the support members and inserting at least one magnetic core member into each of at least some of the slots.

8. The method of claim 1, including assembling a plurality of rotors and a corresponding plurality of stators to thereby form a multiphase motor.

9. The method of claim 1, wherein step (A) includes applying a bonding agent to the stator after performing substeps (1) and (2).

10. The method of claim 1, including forming the first and second stator core portions using a sintered powder material.

11. The method of claim 1, including forming the first and second stator core portions by laminating a plurality of pieces to form a ring.

* * * * *